Patented July 10, 1951

UNITED STATES PATENT OFFICE 2,559,652

PREPARATION OF D-GLUCURONIC ACID

Charles L. Mehltretter, Peoria, Ill., assignor to the United States of America as represented by the Secretary of Agriculture No Drawing. Application April 26, 1949, Serial No. 89,792

4 Claims. (Cl. 260—333)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to a process for the preparation of D-glucuronic acid from calcium 1,2-acetone-D-glucuronate.

Calcium 1,2-acetone-D-glucuronate is prepared by oxidizing 1,2-acetone-D-glucose in accordance with the process described and claimed in my copending application Serial No. 89,791, filed April 26, 1949. As described in this copending application, 1,2-acetone-D-glucose is oxidized by air in the presence of a catalyst, and the product may be recovered in the form of the calcium salt.

According to the present invention, calcium 1,2-acetone-D-glucuronate, $Ca(C_9H_{13}O_7)_2 \cdot 5.5H_2O$, is treated in aqueous solution with oxalic acid. The mixture is then heated at about 75° C. to reflux for 1 to 3 hours. The treatment results in the removal of the acetone residue from acetone glucuronic acid and the quantitative formation of D-glucuronic acid. The chemical reactions involved are as follows:

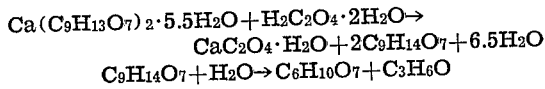

$$C_9H_{14}O_7 + H_2O \rightarrow C_6H_{10}O_7 + C_3H_6O$$

After completion of the reaction, the calcium oxalate precipitate is removed, as for example, by filtration, and crystalline D-glucuronic acid is obtained from the filtrate by concentration.

A particular advantage of my process lies in the fact that no inorganic acid is required for hydrolysis. The amount of oxalic acid added preferably corresponds to the theoretical amount necessary to combine with the calcium ions present. This results in an aqueous solution of the liberated 1,2-acetone-D-glucuronic acid, since the calcium ions and the oxalic acid anion combine to form the extremely insoluble calcium oxalate. I have discovered that this resulting aqueous solution of 1,2-acetone-D-glucuronic acid possesses sufficient acidity to cause removal of the acetone residue by the heating that attends my process. The following examples are illustrative of the invention.

Example 1

To a solution of 14.1 grams of oxalic acid dihydrate in 450 ml. of water was added 70.0 g. of calcium 1,2-acetone-D-glucuronate hydrate. The salt was added portionwise with stirring, and after all had been added the mixture was stirred and heated on the steam bath at 90° C. for 1½ hours. The calcium oxalate precipitate was removed by filtration and washed with hot water. The washings were combined with the filtrate and concentrated in vacuo to a syrup which crystallized to D-glucuronic acid on stirring. Before evaporation, the combined filtrate and washings analyzed 42.1 g. of D-glucuronic acid, a 93 percent yield.

According to my invention the preparation of D-glucuronic acid may be accomplished as in the above example, i. e., in substantially one procedure step, or the procedure may be divided into two separate steps when convenient. For example, the calcium salt of 1,2-acetone-D-glucuronic acid may be converted into the free acid by treatment in cool aqueous solution with the theoretical amount of oxalic acid, the calcium oxalate removed, and 1,2-acetone-D-glucuronic acid crystallized from the filtrate. This may subsequently be redissolved in water and heated at temperatures from 75° C. to reflux for a period of from 1 to 3 hours. Furthermore, the uncrystallized filtrate may be so treated. The heating converts the acid to D-glucuronic acid which may be recovered from the solution by concentration and crystallization. The following example illustrates this variation of my process.

Example 2

Calcium 1,2-acetone-D-glucuronate hydrate was converted to the free acid by treatment in aqueous solution with the theoretical amount of oxalic acid, and the calcium oxalate removed by filtration.

1,2-acetone-D-glucuronic acid was recovered from the filtrate by crystallization, and 2.34 g. were redissolved in 100 cc. of water. The resulting solution was refluxed for 3 hours, after which time it was concentrated in vacuo to a syrup which crystallized to D-glucuronic acid upon stirring.

I claim:

1. Process for the preparation of D-glucuronic acid which comprises treating an aqueous solution of calcium 1,2-acetone-D-glucuronate hydrate with the theoretical amount of oxalic acid necessary to combine with the calcium ions present and heating the resulting aqueous solution of 1,2-acetone-D-glucuronic acid at a temperature from 75° C. to reflux for a period of 1 to 3 hours, without addition of any other hydrolyzing agent and recovering D-glucuronic acid after removal of the precipitated calcium oxalate.

2. Method of claim 1 in which the calcium oxalate is removed after the heating period.

3. Method of claim 1 in which the calcium oxalate is removed prior to the heating period.

4. A process comprising treating an aqueous solution of calcium 1,2-acetone-D-glucuronate with oxalic acid, in an amount no more than theoretically necessary to combine with the calcium ions, and thereafter heating the mixture, which essentially consists of calcium oxalate and an aqueous solution of 1,2-acetone-D-glucuronate, at a temperature from 75° to reflux, without addition of a hydrolyzing agent, to remove the acetone residue, separating the calcium oxalate and recovering D-glucuronic acid.

CHARLES L. MEHLTRETTER.

REFERENCES CITED

The following references are of record in the file of this patent:

UNITED STATES PATENTS

| Number | Name | Date |
|---|---|---|
| 1,862,511 | Pasternack | June 7, 1936 |

OTHER REFERENCES

Zervas: Berichte de deut. chem. Ges., 66B, pp. 1326–1329 (1933).